United States Patent
Novobilski (10) Patent No.: US 10,433,026 B2
(45) Date of Patent: Oct. 1, 2019

(54) SYSTEMS AND METHODS FOR CUSTOMIZED LIVE-STREAMING COMMENTARY

(71) Applicant: MyTeamCalls LLC, Pacific Palisades, CA (US)

(72) Inventor: Andrew John Novobilski, Gulf Shores, AL (US)

(73) Assignee: MyTeamsCalls LLC, Pacific Palisades, CA (US)

( * ) Notice: Subject to any disclaimer, the term of this patent is extended or adjusted under 35 U.S.C. 154(b) by 0 days.

(21) Appl. No.: 15/559,320

(22) PCT Filed: Feb. 24, 2017

(86) PCT No.: PCT/US2017/019521
§ 371 (c)(1),
(2) Date: Sep. 18, 2017

(87) PCT Pub. No.: WO2017/151443
PCT Pub. Date: Sep. 8, 2017

(65) Prior Publication Data
US 2018/0077467 A1 Mar. 15, 2018

Related U.S. Application Data

(60) Provisional application No. 62/301,031, filed on Feb. 29, 2016.

(51) Int. Cl.
*H04N 7/16* (2011.01)
*H04N 21/81* (2011.01)
(Continued)

(52) U.S. Cl.
CPC ......... *H04N 21/8126* (2013.01); *G06Q 30/02* (2013.01); *H04L 29/06* (2013.01);
(Continued)

(58) Field of Classification Search
CPC ............ H04N 21/8126; H04N 21/439; H04N 21/233; H04N 21/44; H04N 21/454;
(Continued)

(56) References Cited

U.S. PATENT DOCUMENTS 7,653,921 B2 * 1/2010 Herley ..................... H04N 7/16
382/100
7,716,662 B2 * 5/2010 Seiden ...................... G06F 8/61
717/173

(Continued)

FOREIGN PATENT DOCUMENTS

WO 2013148003 A1 10/2013
WO 2017151443 A1 9/2017

OTHER PUBLICATIONS

International Search Report and Written Opinion for PCT/US2017/019521 dated May 5, 2017, 8 pages.

*Primary Examiner* — Michael B. Pierorazio
(74) *Attorney, Agent, or Firm* — Jennifer Hayes; Nixon Peabody LLP (57) ABSTRACT

Systems and methods for replacing a portion of a broadcast content with a customized, live-streaming alternate media stream are provided. Usable by applications developed for the Web, mobile devices, laptop or desktop computers, or broadcast television, the system includes a broadcast server to prepare customized media streams for a particular broadcast in communication with a client receiver capable of receiving a customized media stream and synching the stream with the particular broadcast of interest. Thus, the user may view the original broadcast with the alternative audio or video stream, in some cases in near real-time, and enjoy the alternative media stream seamlessly with the original broadcast. In order to provide the capabilities disclosed herein, a fingerprinting method is used to analyze the (Continued)

original broadcast and synchronize timing, without modifying the original broadcast data.

16 Claims, 10 Drawing Sheets

(51) Int. Cl.
*G06Q 30/02* (2012.01)
*H04L 29/06* (2006.01)
*H04N 7/085* (2006.01)
*H04N 21/233* (2011.01)
*H04N 21/234* (2011.01)
*H04N 21/43* (2011.01)
*H04N 21/439* (2011.01)
*H04N 21/44* (2011.01)
*H04N 21/45* (2011.01)
*H04N 21/454* (2011.01)
*H04N 21/462* (2011.01)
*H04N 21/8547* (2011.01)
*G06N 20/00* (2019.01)

(52) U.S. Cl.
CPC ......... *H04L 65/4076* (2013.01); *H04N 7/085* (2013.01); *H04N 21/233* (2013.01); *H04N 21/234* (2013.01); *H04N 21/4302* (2013.01); *H04N 21/439* (2013.01); *H04N 21/44* (2013.01); *H04N 21/454* (2013.01); *H04N 21/4532* (2013.01); *H04N 21/4622* (2013.01); *H04N 21/8547* (2013.01); *G06N 20/00* (2019.01); *G06Q 30/0261* (2013.01); *G06Q 30/0269* (2013.01); *H04N 21/812* (2013.01)

(58) Field of Classification Search
CPC ........... H04N 21/4532; H04N 21/4302; H04N 21/4622; H04N 21/234; H04N 21/8547; H04N 21/812
USPC .......................................................... 725/28
See application file for complete search history.

(56) References Cited

U.S. PATENT DOCUMENTS

| | | | | |
|---|---|---|---|---|
| 8,510,770 B1* | 8/2013 | Oztaskent | ............... | H04L 67/22 705/319 |
| 8,700,194 B2* | 4/2014 | Bauer | ................... | G10L 19/018 700/94 |
| 9,094,715 B2* | 7/2015 | Neumeier | .......... | H04N 5/44591 |
| 9,203,538 B2* | 12/2015 | Anniballi | ............... | H04H 60/44 |
| 2002/0083060 A1* | 6/2002 | Wang | ................ | G06F 17/30743 |
| 2003/0063217 A1* | 4/2003 | Smith | ..................... | H04N 7/088 348/460 |
| 2004/0143349 A1* | 7/2004 | Roberts | ............. | G06F 17/30017 700/94 |
| 2005/0108751 A1* | 5/2005 | Dacosta | ................ | G06F 3/0482 725/39 |
| 2005/0144455 A1* | 6/2005 | Haitsma | ............ | G06F 17/30743 713/176 |
| 2007/0055500 A1* | 3/2007 | Bilobrov | ........... | G06F 17/30743 704/217 |
| 2007/0124756 A1* | 5/2007 | Covell | .............. | G06F 17/30743 725/18 |
| 2007/0124775 A1* | 5/2007 | DaCosta | ........... | G06F 17/30017 725/110 |
| 2007/0217648 A1* | 9/2007 | Muehlbauer | ............ | G11B 27/11 382/100 |
| 2008/0060036 A1* | 3/2008 | Cox | .................. | G06F 17/30017 725/110 |
| 2008/0082510 A1* | 4/2008 | Wang | ..................... | H04H 60/37 |
| 2010/0146042 A1 | 6/2010 | Kruhoeffer et al. | | |
| 2010/0293568 A1* | 11/2010 | Jarman | .................. | H04H 60/31 725/14 |
| 2010/0329547 A1* | 12/2010 | Cavet | ................ | G06F 17/30802 382/164 |
| 2011/0276993 A1 | 11/2011 | Ferguson | | |
| 2011/0289098 A1* | 11/2011 | Oztaskent | ......... | G06F 17/30026 707/769 |
| 2011/0313856 A1* | 12/2011 | Cohen | ............... | G06F 17/30026 705/14.49 |
| 2012/0062793 A1* | 3/2012 | Vanderhoff | .............. | H04N 5/04 348/514 |
| 2012/0144435 A1* | 6/2012 | Spilo | ........................ | H04N 5/76 725/78 |
| 2013/0011008 A1* | 1/2013 | Ikezoye | ............. | G06F 17/3002 382/100 |
| 2013/0057759 A1 | 3/2013 | Suess et al. | | |
| 2013/0205330 A1* | 8/2013 | Sinha | .................... | G06T 1/0021 725/28 |
| 2013/0223816 A1 | 8/2013 | Gharaat et al. | | |
| 2013/0254793 A1* | 9/2013 | Anniballi | ............... | H04H 60/65 725/18 |
| 2013/0308818 A1* | 11/2013 | MacIntosh | ............ | G06T 1/0021 382/100 |
| 2014/0007152 A1* | 1/2014 | Pora | ...................... | H04N 21/254 725/18 |
| 2014/0013352 A1* | 1/2014 | Shavit | ................ | H04N 21/8358 725/34 |
| 2014/0089307 A1* | 3/2014 | Garside | ............. | G06F 17/30023 707/736 |
| 2014/0115627 A1* | 4/2014 | Lee | ...................... | H04N 21/812 725/34 |
| 2014/0196077 A1* | 7/2014 | Gordon | .............. | H04N 21/8358 725/31 |
| 2014/0282662 A1* | 9/2014 | Major | ................ | H04N 21/8358 725/18 |
| 2014/0289754 A1* | 9/2014 | Riethmueller | .... | G06F 17/30846 725/19 |
| 2014/0351865 A1* | 11/2014 | Gresta | ................ | H04N 21/2365 725/61 |
| 2015/0020137 A1* | 1/2015 | Iwanami | ................ | H04N 21/4122 725/116 |
| 2015/0143416 A1* | 5/2015 | Onno | ................ | H04N 21/4307 725/34 |
| 2016/0094877 A1* | 3/2016 | Heffernan | ........ | H04N 21/44008 725/19 |
| 2017/0251250 A1* | 8/2017 | Lee | .................. | H04N 21/23418 |

* cited by examiner

SYSTEMS AND METHODS FOR CUSTOMIZED LIVE-STREAMING COMMENTARY

CROSS-REFERENCE TO RELATED APPLICATION

This application is a National Phase of International Application No. PCT/US2017/019521, filed Feb. 24, 2017, which designated the U.S. and that International Application was published under PCT Article 21(2) in English. This application claims priority to U.S. Provisional Application 62/301,031, filed on Feb. 29, 2016, the content of which is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present disclosure relates to media synching technology, and, more particularly, to systems and methods for substituting, in real time, alternative media content for a portion of an existing media stream.

BACKGROUND

There are many instances where portions of a broadcast may be undesirable. For example, it may be undesirable to attempt to enjoy a sporting event with a particularly bad announcer, or an announcer that is clearly rooting for the "other" team. But, completely muting the audio may take away from the enjoyment of the broadcast, for example, in the sporting event context, removing facets of the game such as crowd noise, referee calls, and other audio events that are desirable to the viewer.

In addition to sporting events, there are times when having simultaneous broadcasting of alternative audio or video would be of value. For example, an important speech given in one language that must be translated into multiple other languages, or lessons in an on-line class that would benefit from alternative explanation of the concepts being discussed, would be of greater value if other elements from the original broadcast source could be kept in synch with the alternative audio. Similarly, it may be desirable to substitute an alternative video stream for the original, while keeping the substitute video stream in synch with the original audio broadcast.

Thus, it is desirable to have a method for replacing and/or augmenting an audio or video portion of a broadcast with a more desirable track, and to do so in a manner that does not require any modifications to the existing broadcast. In order for this replacement to be effective, the new track must be synched with the broadcast such that the new track aligns with events occurring in the broadcast. Thus, such an improvement would provide the capability for a viewer to select an alternative audio or video stream and seamlessly experience the broadcast with that alternative stream. Aspects of the present disclosure fulfill these and other desires.

SUMMARY

According to aspects of the present disclosure, a system for preparing and presenting customized media streams in association with a broadcast is provided. The system comprises a broadcast server, a client receiver in communication with the broadcast server, and a common time source shared between the client receiver and broadcast server. The broadcast server is operative to receive a broadcast and a customized media stream to be associated with the broadcast, and the broadcast server generates a fingerprinted media stream and transmits the fingerprinted media stream to the client receiver. The client receiver is operative to receive the fingerprinted media stream and the broadcast, and analyze the fingerprinted media stream in combination with the broadcast, for presenting the customized media stream in synchronization with the broadcast.

According to further aspects of the present disclosure, a method for transmitting a fingerprinted media stream to be synchronized with a program is provided. The method comprises receiving, at a broadcast server, program content containing audiovisual data, an alternative media stream to be associated with the program content, and time information from a common time source. The broadcast server prepares, from the program content, time information, and alternative media stream, a fingerprinted media stream to be synchronized with the program such that the fingerprinted media stream comprises a plurality of fingerprints relative to fixed time points within the program. The broadcast server transmits the fingerprinted media stream to facilitate playback of the alternative media stream in synchronization with the program.

According to further aspects of the present disclosure, a method for synchronizing audiovisual data with an alternative audio stream is provided. The method comprises receiving broadcast information containing audiovisual data, determining broadcast fingerprint data from analysis of the broadcast information, receiving an alternative audio stream, generating a fingerprinted media stream according to the broadcast fingerprint data and alternative audio stream, and transmitting the fingerprinted media stream to a plurality of client receivers so that the video portion of the broadcast information may be presented in synchronization with the alternative audio stream, by using the fingerprinted media stream to filter a portion of the alternative audio stream.

These and other capabilities of the invention, along with the invention itself, will be more fully understood after a review of the following figures, detailed description, and claims.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation." Additionally, the singular terms "a," "an," and "the" include plural referents unless context clearly indicates otherwise.

The disclosure herein provides systems and methods to prepare, transmit, receive, and synchronize an alternative content stream, in order to replace and/or augment one content stream within a broadcast with another. The process uses a time stamp encoding mechanism to assist in synchronizing timing between the original stream and a new or alternative stream. Additionally, the synching technology may include additional features and/or commands allowing an analyst to indicate where advertisements or other events of interest may have been inserted into the original stream, to facilitate a personalized advertising service for clients receiving the alternative stream. The synching technology may be used with applications developed for the Internet, mobile devices, laptops, broadcast TV, satellite TV, or other network, computing and/or broadcast applications. Also, the disclosures herein may be used with recorded events.

Thus, according to embodiments of the present disclosure, by fingerprinting unique points in an existing broadcast, an alternative audio or video stream may be created and synched with the existing broadcast, such that the alternative audio or video stream is timed appropriately with the original content in the existing broadcast, i.e. the separate streams are experienced by the client as a synchronized audiovisual broadcast.

In one such embodiment, a broadcast sporting event such as a football game may have an announcing team that is undesirable to the listener. For example, they may be "favoring" a team opposite to the rooting interest of the user, or just subpar in their announcing capabilities.

A user may select from alternative audio broadcast(s) of the football game, by searching for available alternative broadcasts online, through a customized receiver, or by other search method. As further detailed below, the selected alternative audio stream is received by the customized receiver and synchronized with the existing broadcast such that the audio coordinates with the on-screen activity. For example, the audio explanation of a referee will occur at the same time as the referee is mouthing the explanation on the existing broadcast. The modified event, comprising the alternative audio feed and the existing video signal, is provided in near real-time, such that a live sporting event or similarly time sensitive production can be enjoyed prior to receiving phone or internet updates or other "spoilers."

In addition to sporting events, there are many other occasions when simultaneous broadcasting of alternative audio or video would be of value. For example, an important speech given in one language that must be translated into multiple other languages, or lessons in an on-line class that would benefit from alternative explanation of the concepts being discussed, would be of greater value if other elements from the original broadcast source could be kept in synch with the alternative audio.

Additionally or alternatively, a provider may offer alternative video content for synching with an existing broadcast. For example, a provider of an alternative media stream might also provide visual content such as a video of the alternative broadcaster, an animation of the previous sports play, a pop-up display of relevant statistics, alternative camera angles, or other video content as part of the alternative media information being provided. According to some embodiments, this content may be provided in addition to alternative audio being synched with the existing broadcast. In still other embodiments, alternative video content may be provided in addition to existing video content in the existing broadcast, for example, through the use of a pop-up window for this content. In still other embodiments, it may be desirable in to substitute an alternative video stream for the original video stream, while keeping the substitute video stream in synch with the original audio broadcast. As an example, video content containing sign language for a hearing impaired client may be substituted for the original video stream, while maintaining the synchronization with the original audio stream, allowing for enjoyment of a broadcast by both hearing impaired and non-impaired audience members.

Alternatively, the capabilities provided herein can be applied to other types of broadcast events, either live or on-demand, including over-the-air broadcasts, podcasts, network broadcasts or other broadcast mechanism.

For example, a user may select an alternative audio stream for a television broadcast of a political debate, perhaps providing commentary in line with the user's political interests or party affiliation. As another example, alternative audio or video streams may be provided to support a film or television award show, political broadcast, fashion show, or other event of interest. Additionally, the teachings herein may be applied to live or on-demand learning programs, allowing a user to select an alternative language audio stream and/or video stream for an interesting program, thereby easily providing for the translation of a training program of interest.

According to some embodiments, the media stream may be tagged with significant items of interest, allowing a user to directly navigate to that point. Additionally, usability features such as joining the broadcast at any time, replaying the broadcast, pausing the broadcast, or additional features may also be supported.

According to some embodiments, an alternative audio stream may be created by running a specifically configured audio analyst broadcast application (AABA). An audio analyst may use the AABA to produce their custom commentary for a specific broadcast. During the process, the audio analysis can stamp particular points of interest in the audio stream for easy access by a user. For example, in a sporting event an audio analysis may select scoring plays, endpoints of periods, fouls, or other items of interest for marking.

Additionally, advertisements may be added to the alternative media stream, and, according to some embodiments, such advertisements may be tailored to the location of the end user. During an advertisement, the audio and/or video content is suspended and the advertisement is played in its place.

An end user may then review and select from available alternative audio and/or video stream(s) using a client receiver. In order to perform the client receiver functions, the client receiver is communicatively connected to both the original broadcast and the alternative media stream. Client functionality may be provided through a client receiver such as a custom set-top box or specifically configured computer. Alternatively, functionality may be provided through a software application downloaded to an existing mobile computing device, smart TV, gaming system, or other device. Once the user selects the desired alternative media stream, a "start audio stream" or "start video stream" or similar command is selected to begin the broadcast.

Figure 1:
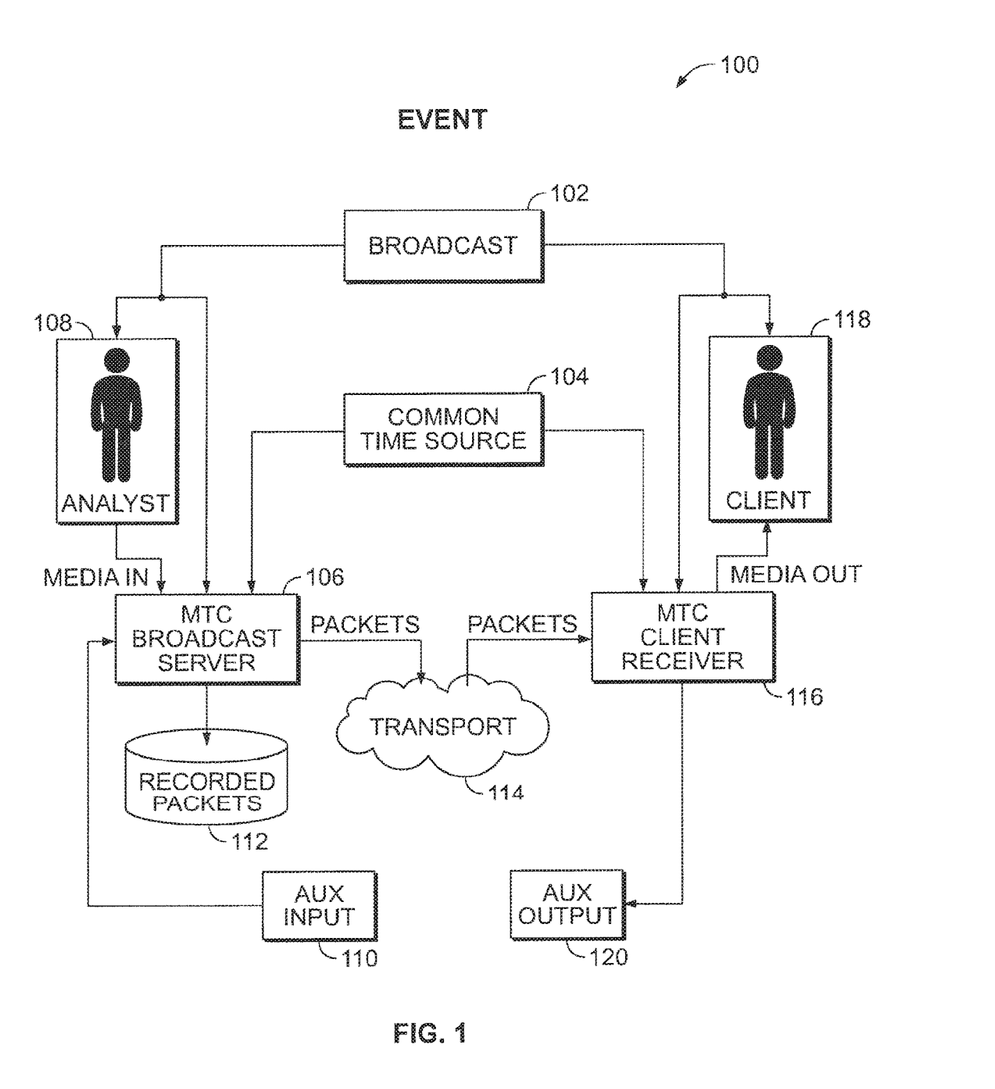
FIG. 1 illustrates an exemplary system for creating and synching an alternative media stream, according to an embodiment of the present disclosure.

Referring now to FIG. 1, a system for creating and receiving alternative media streams associated with a broadcast is provided. According to this exemplary embodiment, an analyst 108 provides customized media associated with a broadcast 102. For example, the analyst 108 may "call the game" in his or her own manner while watching a broadcast sporting event 102. The audio and/or video from the analyst 108 is provided as input to a broadcast server 106. The broadcast server also receives signals from the existing broadcast 102, a common time source 104, and information from one or more auxiliary input sources 110.

The broadcast server combines the input information into information packets that are packaged into a multi-channel stream that is augmented with media fingerprints and then transmitted via the transport mechanism 114. The multi-channel stream is also saved onto an appropriate backup medium for the recorded packets 112 for later use. The broadcast server is further detailed below and in FIG. 3.

The transport mechanism 114 can be any medium capable of conveying streams of packetized information such as the internet, radio, and/or other broadcast technologies.

The client receiver 116 receives signals from the broadcast 102, the common time source 104, and uses that information to decode the packets received from the transport 114 and play them back at the appropriate time based on the media fingerprints captured from the broadcast 102 and the media fingerprints contained in the multi-channel stream being received from the transport 114. This causes the alternative media to be replayed to the client 118 at the appropriate time so it remains in synch with the broadcast 102. The client receiver also decodes the auxiliary information and presents it as output 120.

Figure 2:
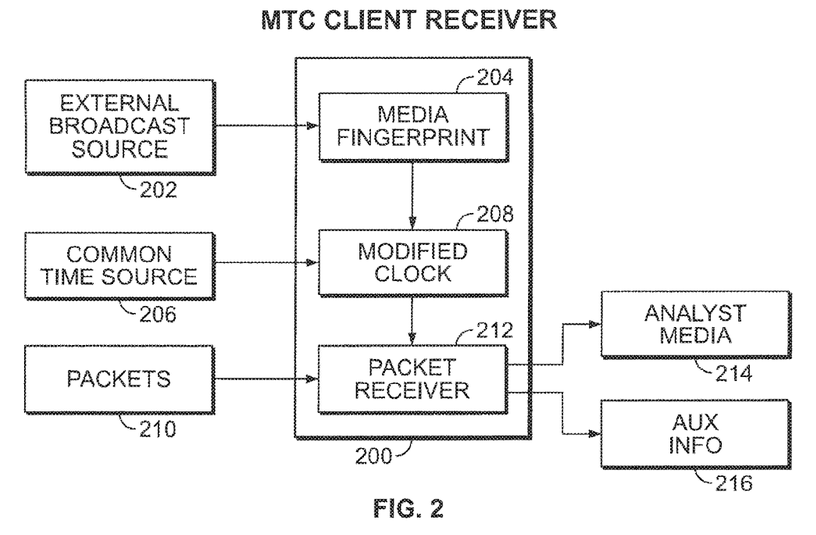
FIG. 2 illustrates an exemplary client receiver, according to an embodiment of the present disclosure.

Turning to FIG. 2, an exemplary client receiver 116 is further detailed. According to this exemplary embodiment, a client receiver is implemented on device 200 and receives as inputs the external broadcast 202, a common time source 206, and packets 210 from the network with the alternative media stream. The external broadcast 202 is analyzed by a media fingerprint process 204 that processes the incoming data, identifies unique media fingerprints, and provides those media fingerprints to the modified clock 208. The modified clock 208 combines the media fingerprint with a timestamp that is created from information given by the common time source 206. The resultant timestamped media fingerprint is passed to the packet receiver 212. The packet receiver 212 uses the timestamped media fingerprint to filter the packets 210 being received to synchronize the analyst media 214 and auxiliary info 216 with the external broadcast source 202. The packet receiver 212 implements this filtering by dropping packets, caching packets, or playing packets depending on the timestamp received from the modified clock 208 and the timestamp included in the packets 210.

Figure 3:
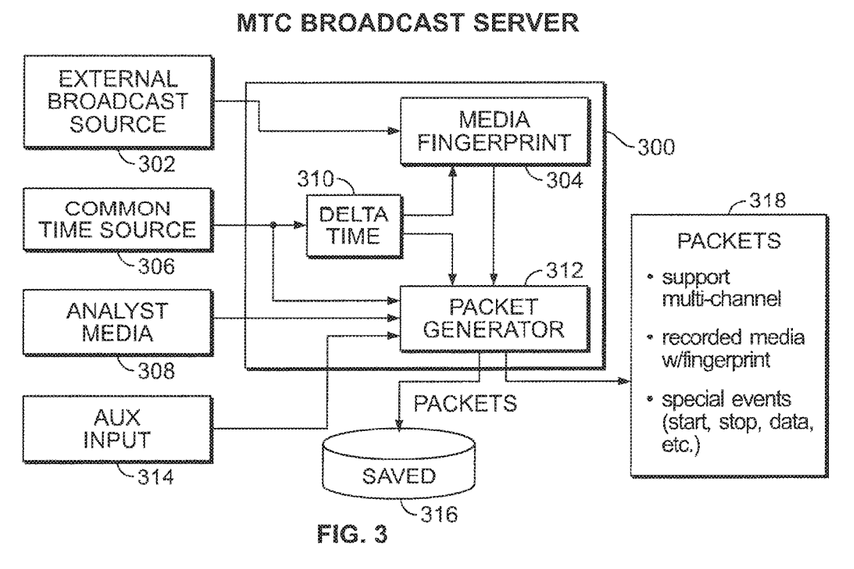
FIG. 3 illustrates an exemplary broadcast server, according to an embodiment of the present disclosure.

Turning to FIG. 3, an exemplary broadcast server 106 is illustrated. According to this exemplary embodiment, a broadcast server is implemented on device 300 and receives as inputs the external broadcast 302, a common time source 306, and the analyst media stream 308. Additionally, the broadcast server may receive input from an auxiliary port 314. A media fingerprint 304 routine running on the broadcast server combines the external broadcast source 302 with a modified time source created by running the common timesource 306 through the delta time 310 process which produces a new time value equivalent to the elapsed time from a known starting point for the external broadcast source 302. The media fingerprint process 304 then generates timestamped media fingerprints relative to a fixed point in the external broadcast source 302 and common time source 306. The packet generator 312 combines input from the media fingerprint 304, delta time 310, analyst media 308 and auxiliary input 314 and produces the packets 318 that represent the multi-channel stream as output. The packets 318 contain information that links the analyst media 308 and auxiliary input 314 with the external broadcast 302, common timesource 306, and media fingerprints that will allow synchronized playback of the stream. Additional, the packet generator 312 saves a copy of the packets 316 to allow for synchronized playback of analyst media 308 and auxiliary input 314 at a later date.

Figure 4:
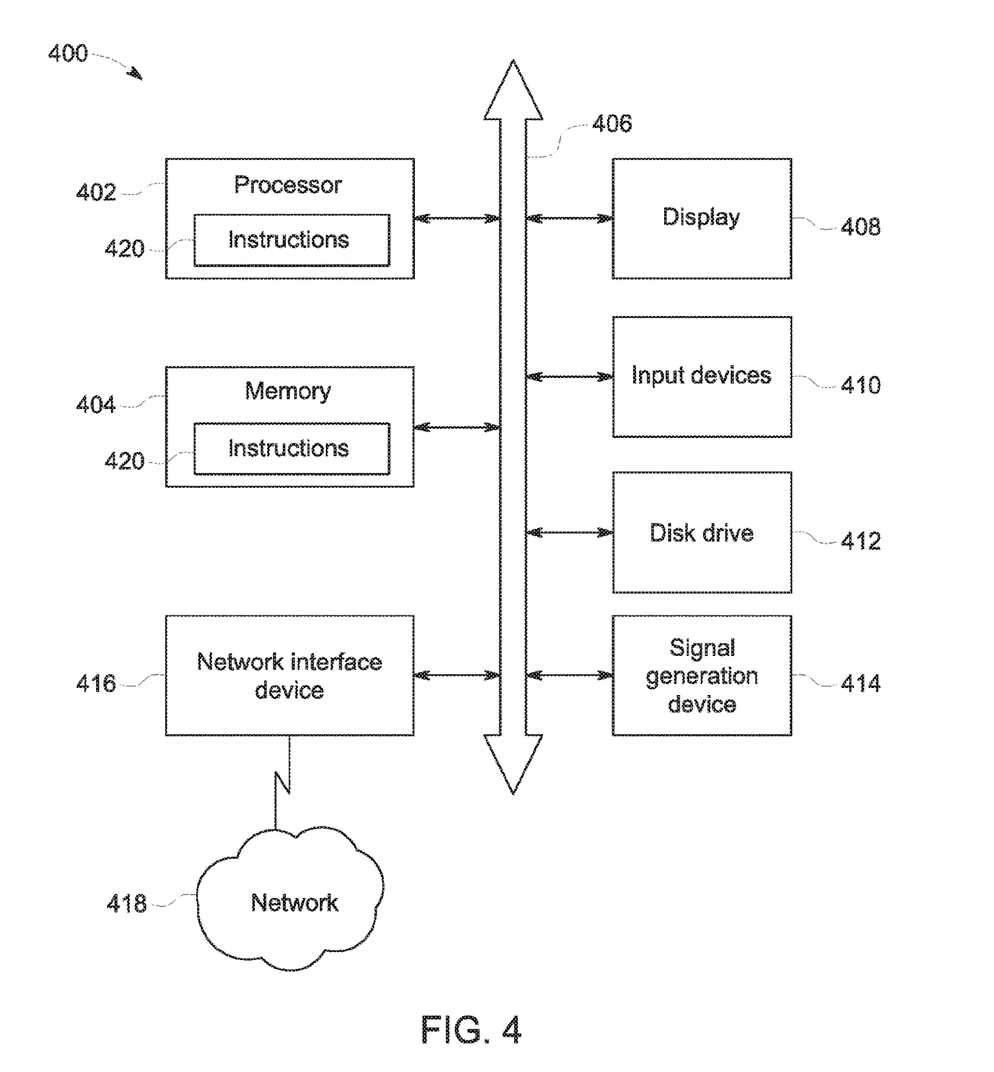
FIG. 4 illustrates an exemplary computer system for performing aspects of the disclosure, according to an embodiment of the present disclosure.

The broadcast server and/or broadcast client may be implemented on one or more computer systems, such as the example computer system 400 shown in FIG. 4. Computer system 400 includes a processor 402 (e.g., a central processing unit (CPU), digital signal processor (DSP), or other processor) and a memory 404, which communicate with each other via a system bus 406 or similar communication mechanism. The computer system 400 may further include a display 408 (e.g., liquid crystal display (LCD) or a cathode ray tube (CRT) monitor). The computer system 400 also may include one or more input devices 410 (such as a mouse, keyboard, microphone, camera, or trackpad), a disk drive unit 412, a signal generation device 414 (e.g., headphones, one or more speakers), and a network interface device 416.

The disk drive unit 412 may comprise a hard disk drive, USB storage drive, removable disk drive (e.g. CD, DVD, Blu-ray) or other storage media with read and/or write capabilities. The network interface device 416 is capable of sending and receiving data from a network 418, such as the Internet, a local area network, company intranet, etc.

One or more sets of instructions 420, in hardware, firmware, software, or a combination thereof, embodying any one or more of the methodologies or functions described herein, may reside within processor 402 and/or memory 404. Additionally or alternatively, instructions 420 may be communicated from disk drive 412 or network 418.

While memory 404 is shown in an example to be a single medium, memory should be taken to include a single medium or multiple media (e.g., centralized or distributed databases, caches, servers, hard disks, etc.) that store one or more sets of instructions 420 and/or other data. The term memory includes any medium that is capable of storing, encoding, or carrying a set of instructions for execution by the machine and that cause the machine to perform any one or more of the methodologies of the various embodiments, or that is capable of storing, encoding, or carrying data structures utilized by or associated with such a set of instructions. The term memory can accordingly be taken to include, but not be limited to, solid-state memories, removable storage, optical media, network storage, and magnetic media.

A variety of different types of memory storage devices, such as a random access memory (RAM) or a read only memory (ROM) in the system or a floppy disk, hard disk, CD ROM, DVD ROM, or other computer readable medium that is read from and/or written to by a magnetic, optical, solid state or other reading and/or writing system that is communicatively coupled to the processor, may be used for the memory.

Furthermore, each of the computing devices of the system 100 may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA), and the like, programmed according to the teachings as described and illustrated herein, as will be appreciated by those skilled in the computer, software, and networking arts.

In addition, two or more computing systems or devices may be substituted for any one of the computing systems in the system 100. Accordingly, principles and advantages of distributed processing, such as redundancy, replication, and the like, also can be implemented, as desired, to increase the robustness and performance of the devices and systems of the system 100. The system 100 may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, etc.

The following description in combination with FIGS. 5-11 illustrate exemplary process flows that may be used for implementing features of the systems and methods disclosed herein, with the understanding that the implementation may be achieved through alternative methods and/or the ordering of particular steps may be adjusted, as will be apparent to one having ordinary skill in the art.

For ease of explanation, the following descriptions and figures relate to an exemplary embodiment for replacing the audio content of an existing broadcast with an alternative audio stream. These descriptions are provided for explanatory purposes and are in no way limiting, as the teachings herein may be applied to substitute, in near real time, the audio and/or video content of a media stream.

In order to process other media streams, such as video, the data is first transformed from a video packet into a single stream of ordered values and then provided as data available for processing. In one such embodiment, the multi-dimensional image data from the video signal is converted to a single stream of data based on a consistent scan order of dimensions. For example, each frame is converted to a stream of data by starting at the top row, evaluating each column in that row in linear order, and then converting the next row in the same manner until all rows in the frame have been processed.

Figure 5:
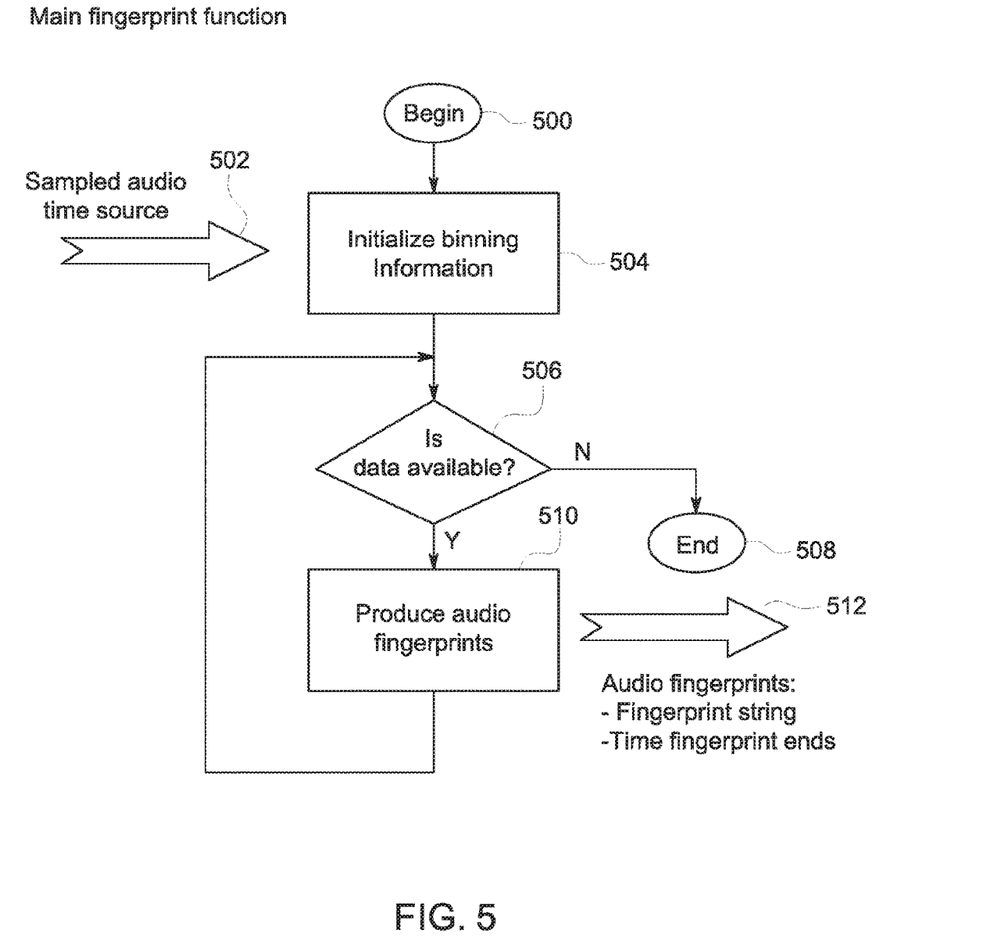
FIG. 5 illustrates an exemplary flowchart for a main audio fingerprint process, according to an embodiment of the present disclosure.

Turning to FIG. 5, an exemplary process flow for a main audio fingerprint process is shown. At 500, the process begins. At 502, the process receives inputs including sampled audio information, such as from a broadcast source, and external time source information that may be used for synchronization. According to some embodiments, the time source may be a system clock, internet clock, or other reliable time source that can be shared across processors and/or devices.

Figure 6:
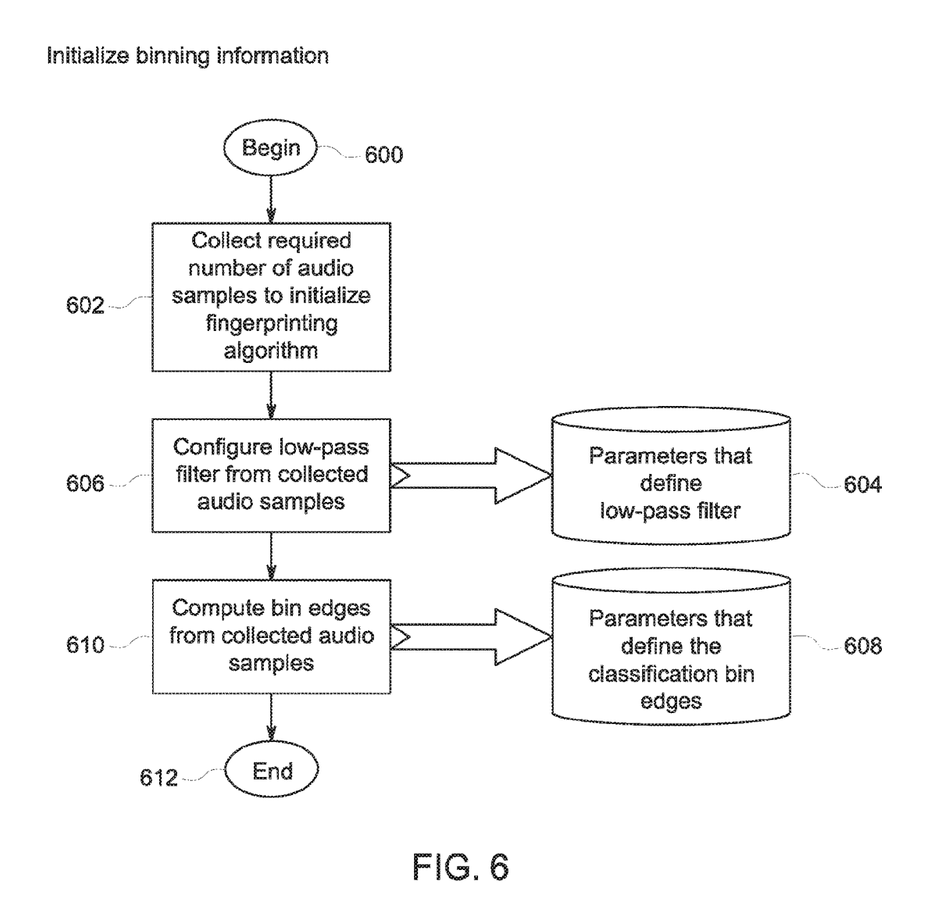
FIG. 6 illustrates an exemplary flowchart for a process to initialize binning information, according to an embodiment of the present disclosure.

At 504, the process initializes the binning information to be used in the fingerprinting process, as further shown in FIG. 6. At 506, a check is performed to see if data from the broadcast source is available. If it is not, the process ends at 508. If data for processing is available, then at 510 the method for producing audio fingerprints is invoked using the current data, and the outputs 512 including a fingerprint string and an associated timestamp are provided by the method 510. Upon conclusion of method 510, the process checks for additional data at 506, and if available, invokes the produce audio fingerprint method again at 510. Thus, the main process shown in FIG. 5 will continue to process incoming data and produce fingerprints as long as additional data is available. Once there is no further data to process, as determined by the check at 506, the process ends at 508.

Turning to FIG. 6, an exemplary process flow for initializing binning information 504 is shown. At 600, the process begins. Generally, the fingerprinting process may be configured to use multiple bins to categorize sampled information, for example samples might be categorized as noise, active content, trigger point, ignore, or other type of bin. The bin boundaries are computed in real-time based on changes in the magnitude of the signal to maintain statistically significant bins during the fingerprinting process. Sample methods for generating bin boundaries include k-means and support vector machine learning algorithms.

At 602, a plurality of audio samples are collected for use in the initialization process. According to some embodiments, the number of audio samples used for initialization may be a configurable parameter. In some embodiments, approximately 10,000 samples are collected per second, and about one minute of data is used for the initialization process.

At 606, the collected audio samples are used to configure an appropriate low-pass filter. The low-pass filter provides the benefit of reducing noise and therefore making it easier to detect one or more trigger points and other information in the audio samples. At 604, the low-pass filter parameters are stored, such as by saving to memory. At 610, the bin edges are computed from the collected audio samples. The bin edge parameters are then stored, such as by saving to memory, at 608. At 612 the process ends and control is returned to the calling process.

Figure 7:
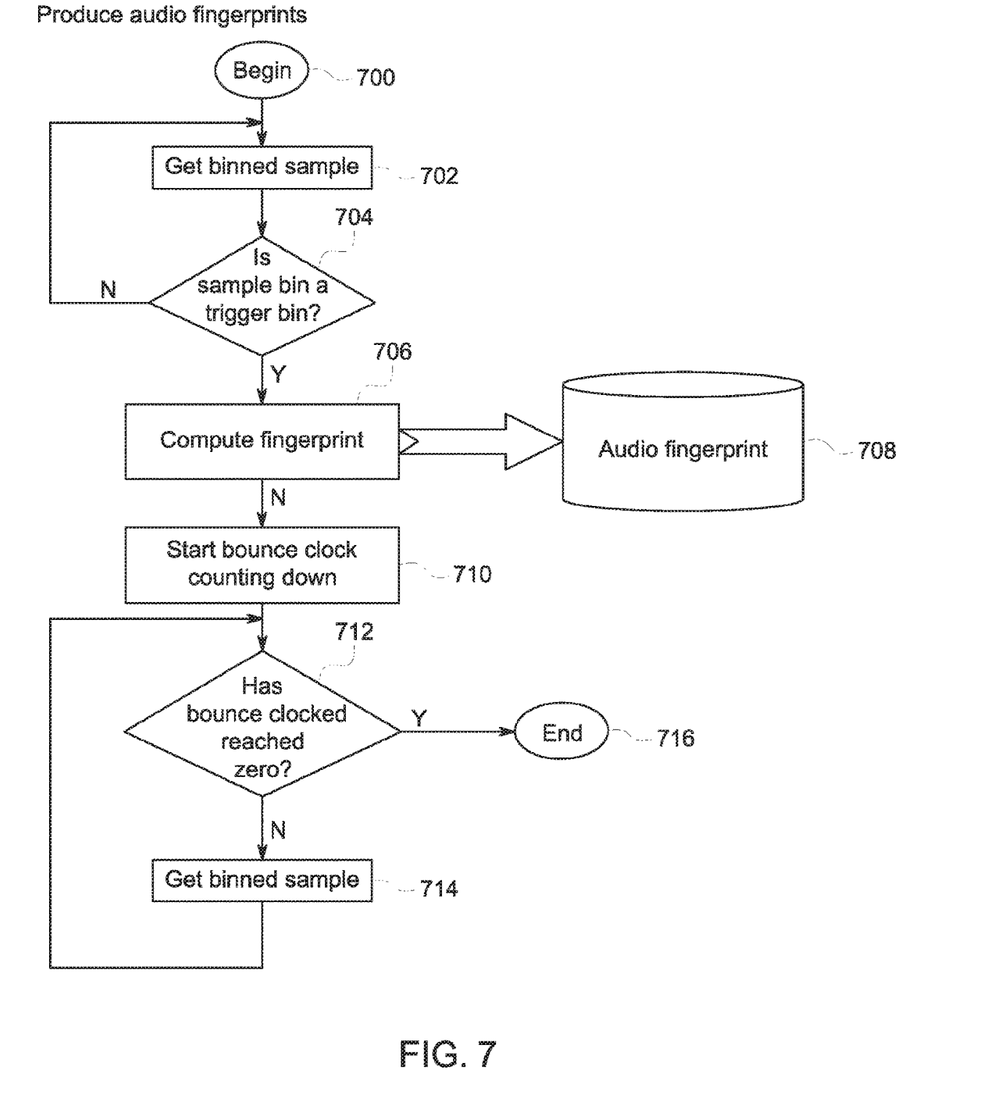
FIG. 7 illustrates an exemplary flowchart for a process to produce audio fingerprints, according to an embodiment of the present disclosure.

Turning to FIG. 7, an exemplary process flow for producing audio fingerprints 510 is shown. At 700, the process begins. At 702, the get binned sample method is invoked as further detailed in FIG. 8. At 704 the classification of the current sample is evaluated. If the sample is not classified as a trigger, then the process goes back to 702 and get binned sample is invoked again for another sample. Once a trigger is found, as determined by the check at 704, the method proceeds to compute fingerprint 706. Compute fingerprint is detailed in FIG. 9. At 708, the fingerprint returned by compute fingerprint is stored for later access.

At 710, a countdown timer is started to cause sampled values immediately following a computed fingerprint 706 to be discarded. This addresses issues that might arise due to different physical devices being used by the broadcast server 106 and client receiver 116 to sample the same broadcast 102 by insuring a sufficient amount of time has passed after an audio fingerprint 708 to insure it is unique within the broadcast. At 712, a check is made to see if the bounce clock has reached zero. If not, at 714 get binned sample is called to get the another sample, and this loop continues until the check at 712 shows the bounce clock has reached zero, at which point the method ends at 716.

Figure 8:
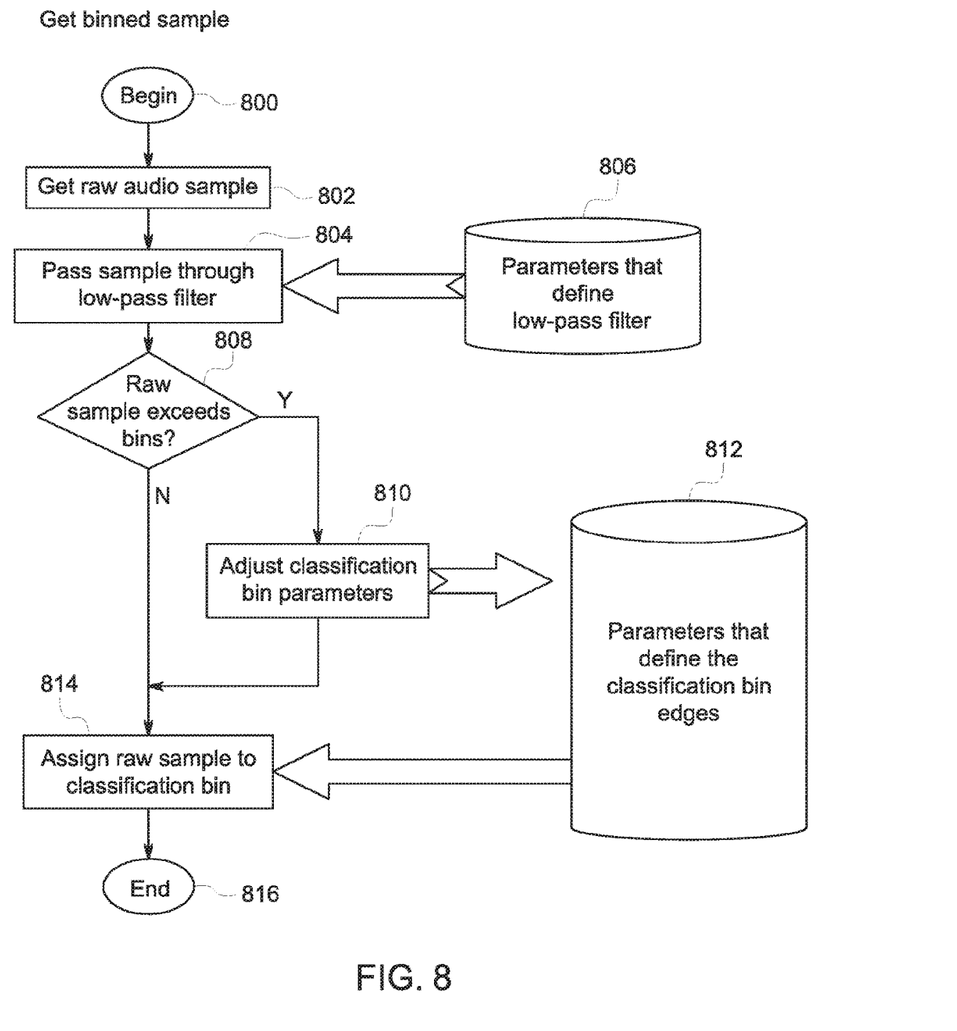
FIG. 8 illustrates an exemplary flowchart for a process to get binned samples, according to an embodiment of the present disclosure.

Turning to FIG. 8, an exemplary process flow for getting a binned sample is shown. At 800, the process begins. Generally, the get binned sample process will get a current sample, filter it appropriately, and classify it by bin. At 802, the process retrieves a raw audio sample for analysis. At 804, the current sample is passed through a low-pass filter, based on the low-pass filter parameters retrieved from storage at 806.

At 808, a check is made to determine if the value of the raw sample exceeds the current bin configuration's maximum allowable value. If so, at 810 an adjustment is made to the classification bin parameters and the adjusted parameters are stored for later retrieval at 812. The process then proceeds to 814. If the check at 808 was negative, the process proceeds directly to 814 from 808.

At 814, the current raw sample is evaluated, using the classification bin parameters stored at 812, and the raw sample is assigned to a classification bin. Classification bins can be configured in terms of both type and number. According to some embodiments the classifications may include trigger, active, noise, ignore, or other bins. Once the raw sample is assigned to a classification bin, the process ends at 816 and returns control to the calling method.

Figure 9:
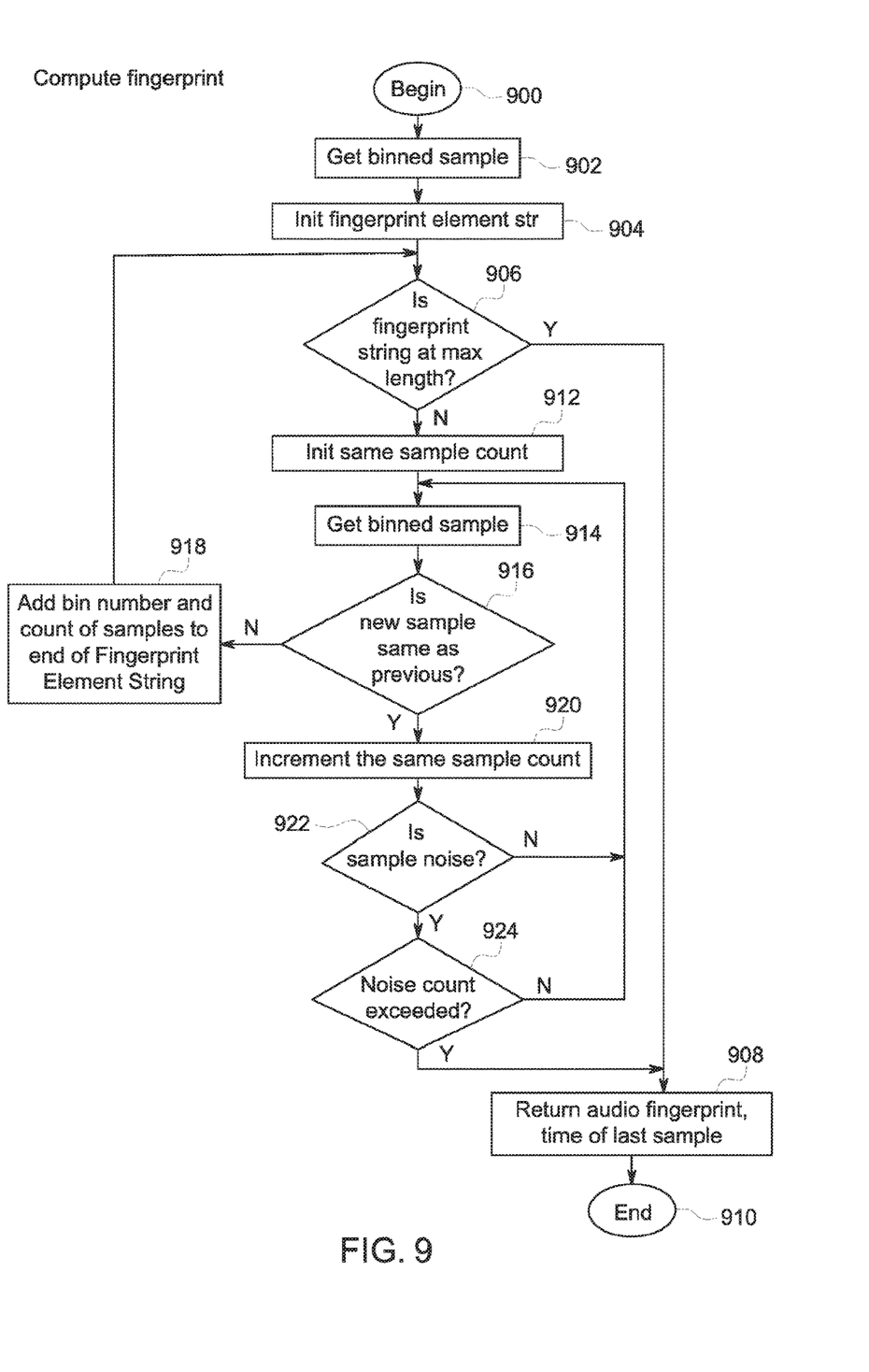
FIG. 9 illustrates an exemplary flowchart for a process to compute fingerprints, according to an embodiment of the present disclosure.

Turning to FIG. 9, an exemplary process flow for computing a fingerprint is illustrated. The method starts at 900 and at 902 get binned sample is called to retrieve a classified sample for analysis. At 904, the fingerprint element string is initialized. At 906, the length of the fingerprint string is checked. If the maximum length is reached (indicating that a full fingerprint has been built), then the method proceeds to 908 and returns the fingerprint and the time of the last sample to the calling process. At 910 the method ends.

Otherwise, if the check at 906 is negative because the fingerprint string is less than a maximum length, the method continues to 912 where the same sample count is initialized. At 914, get binned sample is called to get a current audio sample represented by the bin it has been placed into, and, at 916 this sample's bin is compared to the immediately previous sample's bin.

If the samples do not match, the current sample is added to the fingerprint at 918 and the method continues with the check at 906. If the samples match, then the new sample will not be added to the fingerprint, and the same sample count is incremented at 920. The process then checks to see if the sample is noise at 922, and if so, if the noise count is exceeded at 924, the process jumps to 908, returns data, and ends at 910. Otherwise, if either the check for noise at 922 or the check to see if the noise count is exceeded at 924 is negative, the method goes back to 914 and retrieves the next binned sample. Thus, the checks at 922 and 924 allow the process to continue working if some noise is encountered, but if a substantial amount of noise is encountered then the process will quit.

Figure 10:
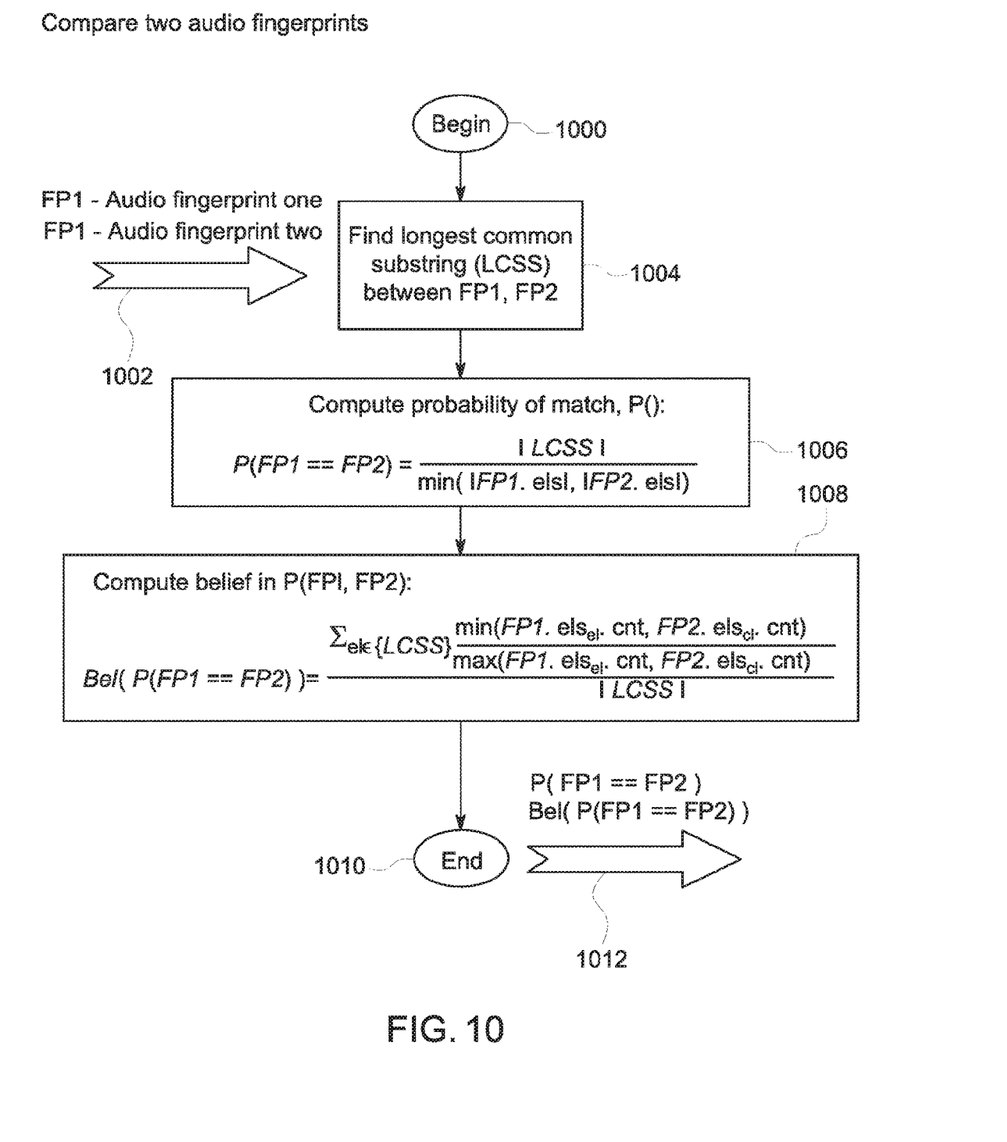
FIG. 10 illustrates an exemplary flowchart for a process to compare two audio fingerprints, according to an embodiment of the present disclosure.

Turning to FIG. 10, an exemplary process flow for a process to compare two audio fingerprints is illustrated. At 1000, the process begins. Two fingerprints of potentially different lengths to be compared 1002, each consisting of strings representing the order of bin and count of samples in that bin, are provided as inputs to the process. At 1004, the longest common substring is identified by algorithmically comparing the strings and locating the longest running sequence of bin and count samples in that bin that are shared by both audio fingerprints. The probability that the fingerprints match is computed at 1006 as a function of the length of the common substring and the smallest overall fingerprint size. This results in assigning a higher probability of match when the substring contains most of the smallest original audio fingerprint. A second measure of sameness is added, computed belief 1008, to account for the potential difference in size of the two audio fingerprints 1002 to be compared. The belief that the computed probability of match 1006 accurately reflects the two fingerprints being statistically equivalent increases with both the size of the two audio fingerprints increasing and the length of the matching substring. This information is used by the client receiver 200 in the modified clock 208 to update the time being used by the packet receiver 212 to determine whether to discard cached packets, to cache unplayed packets, or to continue playing packets as they arrive, as shown in further detail in FIG. 11.

Figure 11:
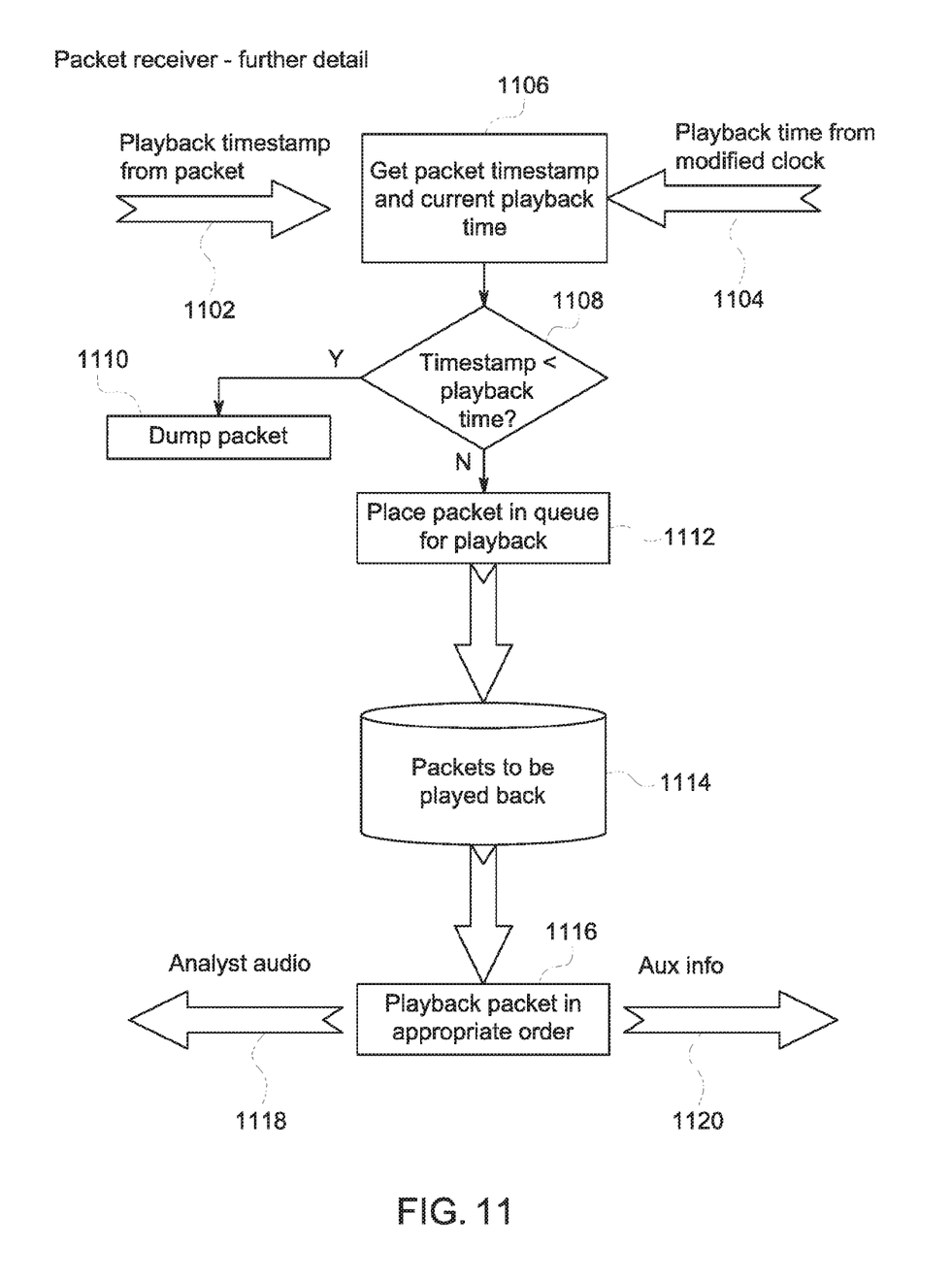
FIG. 11 illustrates an exemplary flowchart providing further detail of the packet receiver illustrated in FIG. 2, according to an embodiment of the present disclosure.

FIG. 11 illustrates an exemplary flowchart providing further detail of the packet receiver illustrated in FIG. 2. As inputs, the process receives the playback timestamp information 1102 from the packet stream as well as the playback time 1104 from the modified clock. These inputs are received at 1106, and compared at 1108. If the timestamp is less than the playback time, the current packet is dumped at 1110, as the broadcast has advanced past the current packet. If the timestamp is not less than the playback time, then at 1112 the current packet is placed in a queue for playback. The process continues for additional packets in the media stream, such that multiple packets passing the check at 1108 are stored at 1114 for playback. At 1116 the stored packets are played back in appropriate order, and the sound is output as the synched analyst media 1118 and auxiliary information 1120.

The systems and methods for customized live-streaming commentary disclosed herein can be performed using one or more processors directly or indirectly connected to a network, such as the Internet or other data network. The one or more processors are configured to communicate with one or more tangible machine-readable storage media including instructions for performing the operations described herein. Machine-readable storage media includes any mechanism that stores information and provides the information in a form readable by a processor. For example, machine-readable storage media includes read only memory (ROM), random access memory (RAM), magnetic-disk storage media, optical storage media, flash memory, etc.

The one or more processors may be configured to accept input from an input device, such as a keyboard, mouse, touchscreen, or other input mechanism, and provide output via an output device such as a display, printer, speaker, or other output mechanism. The one or more processors may be part of a desktop computer, laptop, server, mobile phone, tablet, or other device, or a combination thereof, with sufficient processing power, input/output capabilities, and connectivity to perform the operations described herein. In some embodiments, the one or more processors may be distributed across multiple devices to improve processing speed and/or accessibility.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the invention. It is also contemplated that additional embodiments according to aspects of the present invention may combine any number of features from any of the embodiments described herein.

What is claimed is:

1. A method for transmitting a plurality of fingerprints that have been autonomously identified from a broadcast stream such that an alternative media stream can be synchronized across multiple receivers of the broadcast stream, the method comprising:
   receiving, at a broadcast server, a broadcast stream containing audiovisual data;
   receiving, at the broadcast server, an alternative media stream to be associated with the broadcast stream;
   receiving, at the broadcast server, time information of the audiovisual data from a common time source that is independent of the broadcast server;
   determining the plurality of fingerprints associated with the broadcast stream that will be used to synchronize the alternative media stream with the broadcast stream based at least upon the content of the broadcast stream, the time information, and the alternative media stream, each of the plurality of fingerprints corresponding to a fixed time point in the content of the broadcast stream; and
   transmitting the plurality of fingerprints to one or more recipients to facilitate playback of the alternative media stream in synchronization with the broadcast stream.

2. The method of claim 1, wherein the alternative media stream is a private broadcast restricted via an access control device.

3. The method of claim 2, wherein the access control device restricts the private alternative broadcast via a login and password.

4. The method of claim 1, wherein the broadcast stream is streamed over a network connection.

5. The method of claim 4, wherein the network connection is Internet.

6. The method of claim 1, wherein the alternative media stream comprises an audio stream.

7. The method of claim 6, wherein the audio stream provides an alternative commentary of the content of the broadcast stream.

8. The method of claim 1, wherein the alternative media stream comprises a video stream.

9. The method of claim 1, wherein the determination of the plurality of fingerprints is limited to uniqueness within the broadcast stream, limiting the synchronization of the alternative stream to the broadcast stream regardless of the media in which the broadcast stream is encoded.

10. The method of claim 1, further comprising using statistical machine learning to autonomously detect a trigger event within the broadcast stream that indicate that the fingerprint identified by the trigger event is unique across the plurality of fingerprints determined for the broadcast stream.

11. The method of claim 1, further comprising determining a trigger event, wherein the trigger event is algorithmically defined and used to identify the general location of a one of the plurality of fingerprints within the broadcast stream.

12. The method of claim 11, further comprising, after determining the trigger event, defining a start of the one of the plurality of fingerprints.

13. The method of claim 1, further comprising collecting features used to identify the plurality of fingerprints.

14. The method of claim 1, wherein each of the plurality of fingerprints are matched against a fingerprint identified by the broadcast receiver using a statistical machine learning methodology of a probability-based measure of fitness and belief to identify synchronization points between the alternative media stream and the broadcast stream.

15. A method for synchronizing audiovisual data with an alternative audio stream, the method comprising:
   receiving broadcast information containing audiovisual data;
   analyzing the broadcast information;
   determining broadcast fingerprint data based at least upon analyzed audiovisual data;
   receiving an alternative audio stream;
   autonomously generating a plurality of fingerprints from the received broadcast stream used to synchronize the alternative media stream based at least upon the broadcast fingerprint data and the alternative audio stream;
   transmitting the plurality of fingerprints to a plurality of client receivers; and
   causing the video portion of the broadcast information to be presented in synchronization with the alternative audio stream, based at least upon the plurality of fingerprints, wherein at least one portion of the plurality of fingerprints is filtered in presenting the video portion of the broadcast information and the alternative audio stream.

16. The method of claim 15, wherein the broadcast fingerprint data is matched against a set of prediscovered fingerprints in a same broadcast stream as the broadcast information used to synchronize the alternative audio stream with a re-broadcast of the broadcast information.

* * * * *